(12) United States Patent
Radkevich et al.

(10) Patent No.: US 7,503,831 B2
(45) Date of Patent: Mar. 17, 2009

(54) SYSTEM AND METHOD FOR CUTTING SOLUBLE SCINTILLATOR MATERIAL

(75) Inventors: Olexy V. Radkevich, Schaumburg, IL (US); Keith Ritter, Addison, IL (US); Yuriy Yakovlev, Palatine, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 419 days.

(21) Appl. No.: 11/411,457

(22) Filed: Apr. 26, 2006

(65) Prior Publication Data

US 2007/0252425 A1    Nov. 1, 2007

(51) Int. Cl.
*B28D 1/08* (2006.01)

(52) U.S. Cl. .............................. 451/8; 451/167; 125/21; 125/16.02

(58) Field of Classification Search ...................... 451/8, 451/21, 296, 167; 125/21, 16.02; 83/651.1
See application file for complete search history.

(56) References Cited

U.S. PATENT DOCUMENTS

| | | | | |
|---|---|---|---|---|
| 4,228,782 A | * | 10/1980 | Demers et al. ................. | 125/14 |
| 4,699,032 A | * | 10/1987 | Clark, III ..................... | 83/171 |
| 5,715,807 A | * | 2/1998 | Toyama et al. ........... | 125/16.02 |
| 6,237,585 B1 | * | 5/2001 | Oishi et al. ............... | 125/16.02 |
| 6,328,027 B1 | | 12/2001 | Persyk et al. | |

\* cited by examiner

*Primary Examiner*—Robert Rose
(74) *Attorney, Agent, or Firm*—Peter L. Kendall

(57) ABSTRACT

A system and method for cutting soluble scintillator material are disclosed. The system includes a scintillator cutting apparatus including a filament rotated around a plurality of pulleys in at least one direction and in operative proximity to the material thereby cutting the material. The system also includes a linear motion motor operatively connected to the scintillator cutting apparatus for moving the apparatus to position the filament in operative proximity and a linear motion speed sensor for sensing rate of movement of the apparatus as the apparatus is moved by the linear motion motor to position the filament in operative proximity. The system further includes a master motor controller operatively connected to the linear motion motor and the linear motion sensor, wherein the master motor controller controls the linear motion motor as a function of sensed information obtained from the linear motion speed sensor.

14 Claims, 2 Drawing Sheets

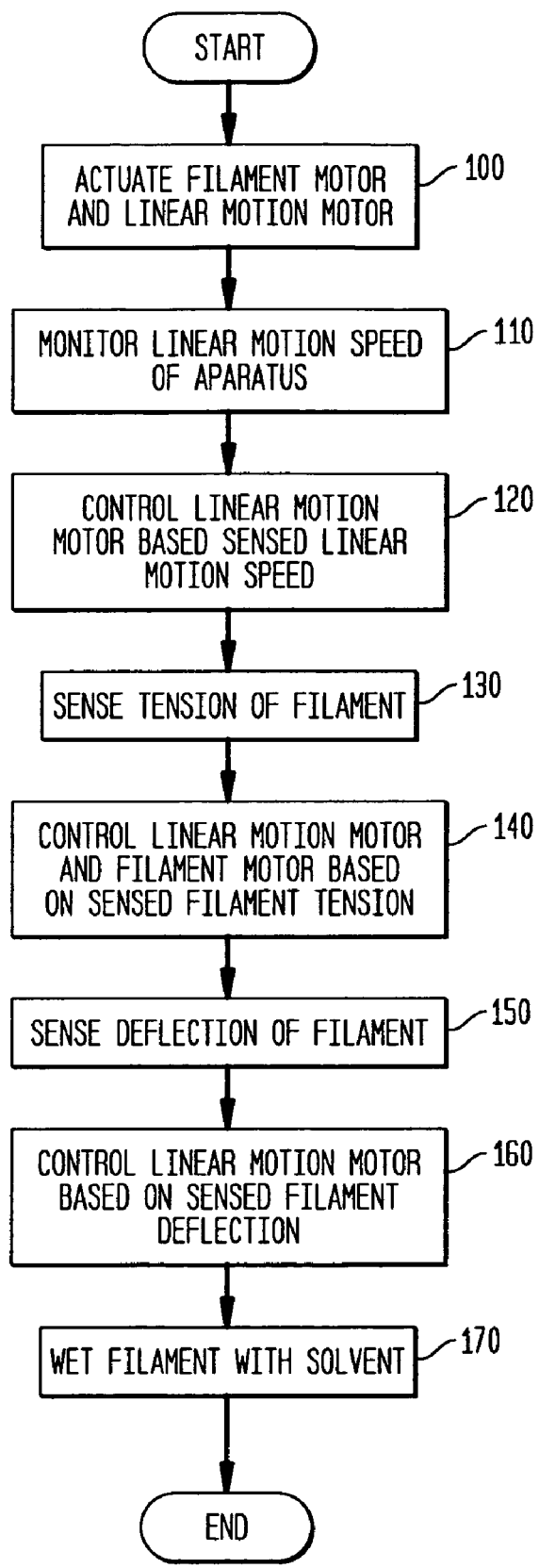

SYSTEM AND METHOD FOR CUTTING SOLUBLE SCINTILLATOR MATERIAL

BACKGROUND

1. Technical Field

The present disclosure relates to a system and method for cutting soluble scintillator material. More particularly, the present disclosure relates to a system and method for slicing, shaping and otherwise cutting soluble scintillator materials using sensed feedback resulting in optimized speed and minimized kerf.

2. Background of Related Art

Soluble crystal scintillator materials are widely used in radiation detection devices, such as gamma cameras of nuclear medicine radioisotope imaging. In particular, scintillator crystals are utilized in emission computed tomography (e.g., single photon emission computed tomography (SPECT) and positron emission tomography (PET)). The SPECT and PET techniques involve injection of radiotracer molecules which emit gamma radiation. The gamma radiation is then collected via specialized gamma-ray detectors which include scintillator crystals. The collected radiation data is then analyzed to construct two-dimensional and/or three-dimensional images of the irradiated region.

The gamma-ray detectors utilized in emission computed tomography systems employ a wide variety of geometric configurations of scintillator crystals. Consequently, the scintillator crystals must be cut, sliced and otherwise shaped into a wide variety of shapes (e.g., rectangular cylindrical, having cuts, slits and/or notches partially through the crystals, etc.) to achieve the desired configuration.

Prior art systems for cutting and shaping scintillator crystals include metal band saws and filament saws. Band saws create straight cuts with wide kerfs. Furthermore, the metal teeth chip the scintillator crystal as well as create sharp and/or jagged edges along a kerf that chips and may break away during use of the scintillator materials. The prior art cutting methods of utilizing filament saws suffered from poor feedback control. In particular, prior art scintillator filament saws utilizing filament deflection feedback as a sole means of controlling the cutting process adjusted filament deflection based on the inhomogeneity of the scintillator crystalline structure. Hence, the adjustments to the cutting process resulting in a kerf that exceeded the optimal size. Therefore, there is a need for a feedback control system for adjusting the cutting motion of scintillator filament saws which allows for smooth kerfs of desired size.

SUMMARY

The present disclosure relates to a system and method for cutting soluble scintillator material. The system includes a scintillator cutting apparatus having a filament motor for moving a filament in a circular motion thereby cutting the material and a linear motion motor for moving the apparatus into operative proximity. The motors are operatively connected to one or more motor controllers. The system also includes a plurality of sensors: a linear motion sensor, a filament fatigue sensor, and a filament deflection sensor which, together, collect feedback information and transmit the detected information to the motor controllers which thereafter control the motors as a function thereof.

According to one aspect of the present disclosure, a system for cutting soluble scintillator material is disclosed. The system includes a scintillator cutting apparatus including a filament rotated around a plurality of pulleys in at least one direction and in operative proximity to the material thereby cutting the material. The system also includes a linear motion motor operatively connected to the scintillator cutting apparatus for moving the apparatus to position the filament in operative proximity and a linear motion speed sensor for sensing rate of movement of the apparatus as the apparatus is moved by the linear motion motor to position the filament in operative proximity. The system further includes a master motor controller operatively connected to the linear motion motor and the linear motion sensor, wherein the master motor controller controls the linear motion motor as a function of sensed information obtained from the linear motion speed sensor.

According to another aspect of the present disclosure, a method for cutting soluble scintillator material is disclosed. The method includes the step of providing a scintillator cutting apparatus having a filament rotated around a plurality of pulleys in at least one direction and in operative proximity to the material thereby cutting the material. The method also includes the steps of actuating a linear motion motor which is operatively connected to the scintillator cutting apparatus thereby moving the apparatus to position the filament in operative proximity and sensing rate of movement of the apparatus through a linear motion speed sensor as the apparatus is moved by the linear motion motor. The method further includes the step of controlling the linear motion motor which is operatively connected to a master motor controller as a function of sensed information obtained from the linear motion speed sensor.

BRIEF DESCRIPTION OF THE DRAWINGS

Various embodiments of the present disclosure are described herein with reference to the drawings wherein:

FIG. 2 is a flow diagram illustrating a method for cutting soluble scintillator material according to an embodiment of the present invention.

DETAILED DESCRIPTION OF EXEMPLARY EMBODIMENTS

Figure 1:
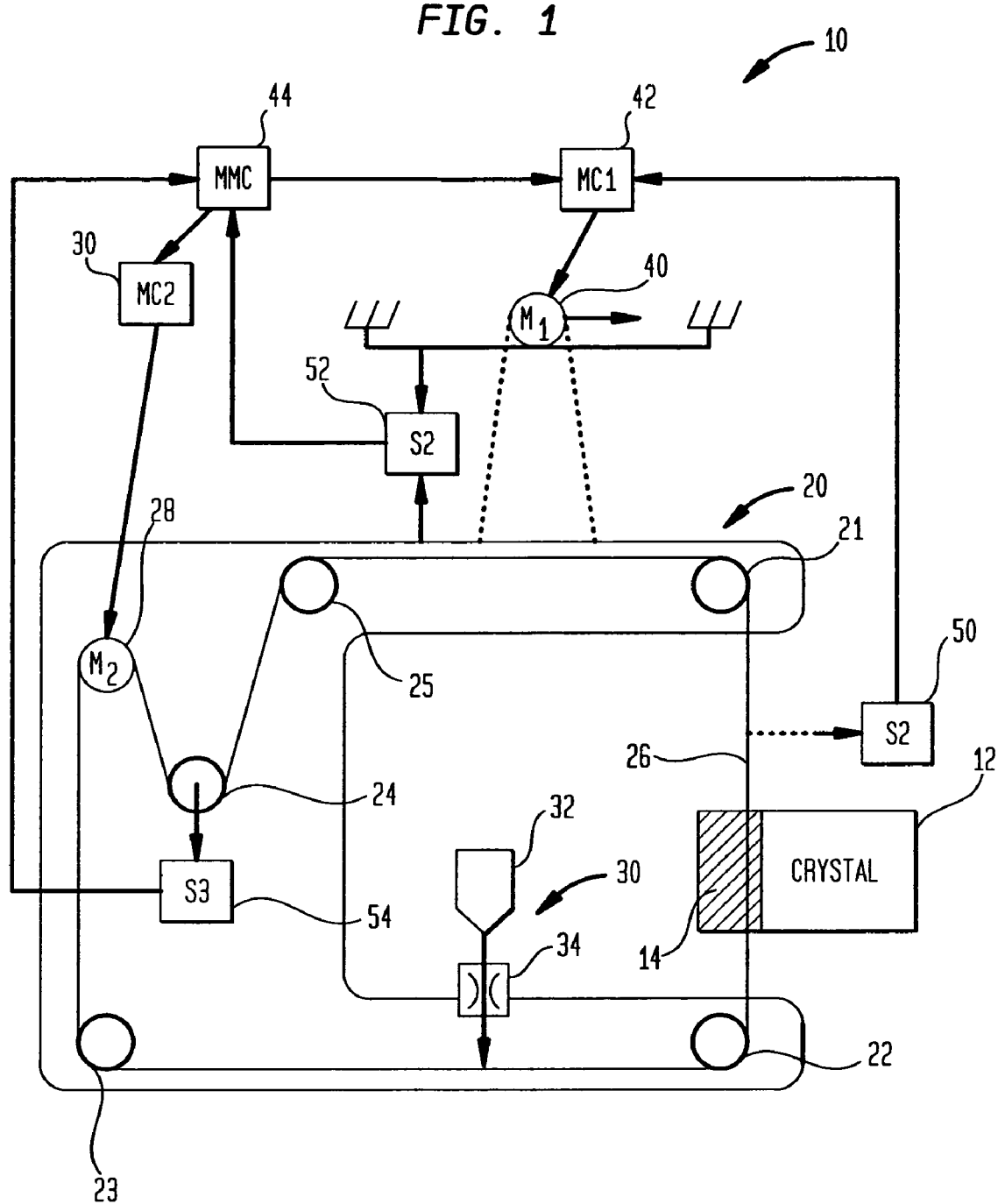
FIG. 1 is a schematic diagram of a system for cutting soluble scintillator material according to an embodiment of the present invention.

Particular embodiments of the present disclosure are described hereinbelow with reference to the accompanying drawings. In the following description, well-known functions or constructions are not described in detail to avoid obscuring the present disclosure in unnecessary detail.

FIG. 1 shows a system 10 for cutting a soluble scintillator material 12. The system 10 includes a scintillator cutting apparatus 20 which includes a filament 26 rotated around a plurality of pulleys 21, 22, 23, 24 and 25. The scintillator cutting apparatus 20 may include a support frame or a casing (not explicitly shown) for mounting pulleys 21, 22, 23, 24 and 25. The filament 26 may be braided from thin flexible thread, such as cotton or wire made from flexible metal. The filament 26 is brought into operative proximity, which denotes physical contact with the scintillator material 12, wherein continuous movement of the filament 26 across a surface of the scintillator material 12 for a predetermined period of time results in cutting thereof and formation of a kerf 14. Continuous cutting of the scintillator material 12 is achieved by moving the filament 26 (e.g., the apparatus 20) in a forward direction toward and into the scintillator material 12.

The filament 26 is wrapped around the pulleys 21, 22, 23, 24 and 25 in a continuous circulating loop with continuous movement in one direction or alternatively the filament 26 is moved in a reciprocating motion, i.e., in one direction and in an opposing direction. The filament 26 is wrapped around the pulley 24 which provides nominal tension thereto. The filament 26 is routed around a filament motor 28 that drives the filament 26 in a continuous loop. The filament 26 thereafter is rotated around the pulley 23 which guides the filament 26 toward pulleys 21 and 22 which provide and adjust pressure exerted on the scintillator material 12 by the filament 26. The pressure pulleys 21 and 22 the filament 26 is then guided around the pulley 25 prior to completing the loop at the pulley 24. It is envisioned that the filament 26 may also be wrapped between a supply pulley and a take-up pulley (not explicitly shown).

The filament motor 28 is electrically and operatively connected to a filament motor controller 30 which regulates the rate of rotation and operational status of the filament motor 28. By regulating the filament motor 28, the filament motor controller 30 regulates the speed of rotation of the filament 26 and hence the cutting rate of the scintillator material 12. The rate of rotation of the filament 26 depends on a number of factors, such as the amount of scintillator material 12 which needs to be cut, the desired depth of the kerf 14, density of the scintillator material 12, homogeneity of the scintillator material 12, etc.

The system 10 also includes a fluid dispenser 32 disposed between the pulleys 22, 23. The fluid dispenser wets the filament 26 with a solvent (e.g., an organic solvent liquid, alcohol, water, etc.). The fluid dispenser 32 includes a fluid reservoir 32 for storing solvent and an adjustable valve 34. The valve 34 regulates the amount of solvent being deposited onto the filament 26. It is envisioned that the solvent may be mixed with water or an alcohol prior to being dispensed. The solvent lubricates the filament 26 thereby reducing the friction between the filament 26 and the scintillator material 12 and allowing for a smooth-edged kerf 14. In particular, the solvent coating the filament 26 dissolves portions of scintillator material 12 in contact with the filament 26 thereby shaping and smoothing the edges of the kerf 14.

A linear motion motor 40 is operatively connected to the scintillator cutting apparatus 20. The linear motion motor 40 moves the scintillator cutting apparatus 20 into operative proximity of the scintillator material 12. This may be accomplished by providing the linear motion motor 40 with guiding means (e.g., wheels moving along a guide track and/or rail). The linear motion motor 40 is controlled by a linear motion motor controller 42 that regulates the speed at which the scintillator cutting apparatus 20 is moved into the scintillator material 12. The rate at which the scintillator cutting apparatus 20 is moved depends on a variety of factors, such as the amount of scintillator material 12 which needs to be cut, the desired depth of the kerf 14, density of the scintillator material 12, homogeneity of the scintillator material 12, etc. These factors and the speed of the scintillator cutting apparatus 20 affect the amount of pressure exerted on the filament 26. Therefore, adjusting the speed at which the scintillator cutting apparatus 20 is moved allows for controlling the pressure exerted on the filament 26.

The filament motor controller 30 and the linear motion motor controller 42 are operatively connected to a master motor controller 44 which is adapted to issue control commands thereto and can, hence, control the entire operation of the scintillator cutting apparatus 20. In particular the master motor controller 44 can regulate operation of the filament motor 28 and the linear motion motor 40 through the respective motor controllers, the filament motor controller 30 and the linear motion motor controller 42, respectively. It is envisioned that the master motor controller 44 can substitute the filament motor controller 30 and linear motion motor controller 42, wherein the master motor controller 44 receives all of the supplied sensed feedback information and directly controls all of the motors of the system 10.

The system 10 includes a plurality of sensors which provide feedback information regarding linear motion of the apparatus 20 as well as the tension of the filament 26 and the pressure exerted thereon (e.g., deflection feedback). More specifically, the system 10 includes a filament deflection sensor 50, a linear motion speed sensor 52, and a filament fatigue sensor 54. The filament deflection sensor 50 provides information on the deflection of the filament 26. The deflection information is used as feedback by the linear motion motor controller 42 to adjust the rate of linear motion. If the filament deflection sensor 50 detects that too much pressure is being exerted on the filament 26 so that the filament 26 is being deformed and/or deflected from intended path, the sensor 50 transmits a warning signal to the linear motion controller 42 which then reduces the linear motion speed of the apparatus 20. The filament deflection sensor 50 allows the system 10 to move the apparatus 20 at an optimum rate without deflecting the filament 26. Thus, the apparatus 20 may be driven at maximum velocity as long as the deflection of the filament 26 does not exceed predetermined filament deflection thresholds.

Maintaining minimal filament deflection minimizes the size of the kerf 14. The linear motion speed sensor 52 senses velocity of the apparatus 20 and reports the linear speed to the master motor controller 44. If the linear motion speed exceeds a predetermined threshold, the master motor controller 44 signals the linear motion motor 40 to decrease the speed and/or shut down. The master motor controller 44 also receives sensed feedback information from the filament fatigue sensor 54. This allows the master motor controller 44 to adjust the cutting process based on two sources of sensed feedback.

The filament fatigue sensor 54 is connected to the tension pulley 24 and actively monitors tension of the filament 26. It is also envisioned that the filament fatigue sensor 54 may be operatively connected to a load weight that allows for adjustment of tension of the filament 26. Tension in the filament 26 produces elongation and since during normal cutting operation, certain amount of tension is expected, elongation of the filament 26 up to a certain point is also tolerated. The filament fatigue sensor 54 alerts the master motor controller 44 if the elongation of the filament 26 exceeds a certain threshold. Since excessive elongation beyond the threshold leads to filament fatigue and fracture, upon excessive elongation of the filament 26 or actual filament fracture, the filament fatigue sensor 54 instructs the master motor controller 44 to cease all motion (e.g., instructs the motors 28 and 40 to shut down).

FIG. 2 shows a method for cutting the scintillator material 12 according to the present disclosure. In step 100, the master motor controller 44 signals the linear motion motor controller 42 and filament motor controller 30 to actuate the linear motion motor 40 and the filament motor 28 respectively. The linear motion motor 40 is actuated to move the apparatus 20 and the filament 26 into operative proximity. The filament motor 28 is also actuated to rotate the filament 26 in either one direction (e.g., clockwise or counterclockwise) or both directions. In step 110, the linear motion sensor 52 continually monitors the velocity of the apparatus and reports the sensed information regarding the linear motion speed to the master motor controller 44.

In step 120, the master motor controller 44 controls the linear motion motor 40 as a function of sensed information obtained from the linear motion speed sensor 52. In step 130, the filament fatigue sensor 54 senses tension of the filament. In step 140, the master motor controller 44 controls the linear motion motor 44 and the filament motor 28 as a function of sensed information obtained from the filament fatigue sensor 54.

In step 150, the filament deflection sensor 50 senses deflection of the filament 26 when the filament is in contact with the scintillator material 12. In step 160, the master motor controller 44 controls the linear motion motor 44 as a function of sensed information obtained from the filament deflection sensor 50. In step 170, the fluid dispenser 32 wets the filament with a solvent.

While several embodiments of the disclosure are shown in the drawings and/or discussed herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed is:

1. A system for cutting soluble scintillator material comprising:
    a scintillator cutting apparatus including a filament rotated around a plurality of pulleys in at least one direction;
    a linear motion motor operatively connected to the scintillator cutting apparatus for moving the apparatus to position the filament;
    a linear motion speed sensor for sensing rate of movement of the apparatus as the apparatus is moved by the linear motion motor to position the filament in operative proximity;
    a master motor controller operatively connected to the linear motion motor and the linear motion sensor, wherein the master motor controller controls the linear motion motor as a function of sensed information obtained from the linear motion speed sensor;
    a filament deflection sensor for sensing deflection of the filament during operation; and
    a linear motion motor controller operatively connected to the linear motion motor and the filament deflection sensor, wherein the linear motion motor controller controls the linear motion motor as a function of sensed information obtained from the filament deflection sensor.

2. A system as in claim 1, wherein at least one pulley is a tension pulley adapted for adjusting tension of the filament.

3. A system as in claim 2, further comprising:
    a filament fatigue sensor operatively connected to the tension pulley for sensing tension of the filament; and
    a filament motor adapted for driving and controlling rotation of the filament, wherein the master motor controller is further operatively connected to the filament motor and the filament fatigue sensor and is adapted to control the linear motion motor and the filament motor as a function of sensed information obtained from the filament fatigue sensor.

4. A system as in claim 1, further comprising:
    a load weight operatively connected to the tension pulley, wherein a filament fatigue sensor is further operatively connected to the load weight.

5. A system as in claim 1, further comprising:
    a fluid dispenser comprising a solvent, the fluid dispenser adapted for wetting the filament.

6. A system as in claim 5, wherein the solvent is selected from the group consisting of an alcohol and an organic-based solvent.

7. A system as in claim 1, wherein at least one pulley is a guiding pulley adapted for guiding the filament.

8. A system as in claim 1, wherein at least two pulleys are pressure pulleys adapted for adjusting pressure of the filament on a scintillator material when the filament is in operative proximity thereto.

9. A method for cutting soluble scintillator material comprising the steps of:
    providing a scintillator cutting apparatus including a filament rotated around a plurality of pulleys in at least one direction and in operative proximity to a scintillator material to be cut;
    actuating a linear motion motor which is operatively connected to the scintillator cutting apparatus thereby moving the apparatus to position the filament in operative proximity to the material;
    sensing rate of movement of the apparatus through a linear motion speed sensor as the apparatus is moved by the linear motion motor;
    controlling the linear motion motor which is operatively connected to a master motor controller as a function of sensed information obtained from the linear motion speed sensor;
    sensing deflection of the filament when the filament is in contact with the material through a filament deflection sensor; and
    controlling the linear motion motor as a function of sensed information obtained from the filament deflection sensor.

10. A method as in claim 9, wherein at least one pulley is a tension pulley adapted for adjusting tension of the filament.

11. A method as claim 9, wherein the tension pulley is operatively connected to a load weight, wherein a filament fatigue sensor is further operatively connected to the load weight.

12. A method as in claim 10, further comprising the steps of:
    sensing tension of the filament through a filament fatigue sensor operatively connected to the tension pulley; and
    controlling the linear motion motor and the filament motor as a function of sensed information obtained from the filament fatigue sensor, wherein the master motor controller is further operatively connected to the filament motor and the filament fatigue sensor.

13. A method as claim 9, further comprising the step of:
    wetting the filament with a solvent which is dispensed from a fluid dispenser.

14. A method as claim 13, wherein the solvent is selected from the group consisting of an alcohol and an organic-based solvent.

* * * * *